United States Patent Office 3,239,533
Patented Mar. 8, 1966

3,239,533
(PHENYL-ISOXAZOLYL)-DIAZOMETHYL-
KETONES
Hideo Kano, Kyoto-shi, Kyoto, and Ikuo Adachi, Toyo-
naka-shi, Osaka, Japan, assignors to Shionogi & Co.,
Ltd., Osaka-shi, Japan
No Drawing. Filed Dec. 2, 1963, Ser. No. 327,480
Claims priority, application Japan, Jan. 24, 1963,
38/3,475
7 Claims. (Cl. 260—307)

The present invention is concerned with (phenyl-isoxa-zolyl)-diazomethylketones of the formula

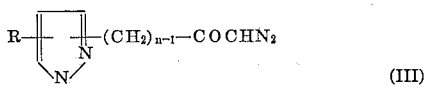

(III)

wherein R is a substituted or unsubstituted phenyl group, and n is an integer from 1 to 5. When the symbol R in the above Formula III represents a substituted phenyl group, the substituent present on the benzene ring may be lower alkyl (e.g. methyl, ethyl, propyl), lower alkoxy (e.g. methoxy, ethoxy, propoxy) or halogen (e.g. chlorine, bromine), and which is especially useful as an intermediate for the preparation of isoxazole derivatives represented by the formula:

(I)

wherein R and n have the aforesaid significances, and R' is a hydrogen atom or a lower alkyl group (e.g. methyl, ethyl, propyl, etc.).

The said carboxylic acid or ester thereof (I) can be prepared by reacting a carboxylic acid halide represented by the formula:

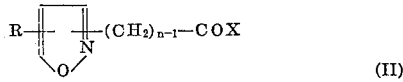

(II)

wherein X is a halogen atom (e.g. chlorine, bromine) and R and n each has the same significance as designated above, with diazomethane and reacting the resulting diazomethylketone (III) with water or a lower alkanol.

The starting carboxylic acid halide (II) may be prepared according to the following scheme [cf. Angeri: Ber., vol. 23, p. 2195 (1889); Magnaini et al.: Lincei-Rend. Sc. fis. mat. e nat., vol. 14, p. 95 (1953)]:

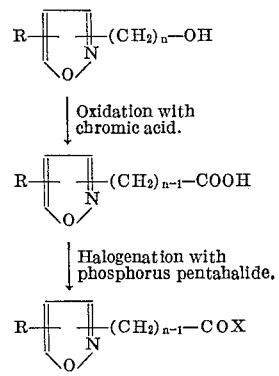

wherein R, X and n each has the same significance as designated above.

According to the present invention, the carboxylic acid halide (II) is first reacted with diazomethane in an inert solvent (e.g. tetrahydrofuran, dioxane, ether, benzene) at a temperature from −10 to 50° C. (preferably room temperature, i.e. about 10–30° C.) in the presence of a base such as aliphatic amine (e.g. trimethylamine, tri-ethylamine) and aromatic amine (e.g. pyridine, picoline). In place of the said base, there may be used diazomethane per se in an excess amount. The thus prepared diazomethylketone (III) can then be reacted with water or a lower alkanol (e.g. methanol, ethanol, propanol), preferably in the presence of a catalyst such as silver oxide and silver benzoate, at a temperature from room temperature to reflux temperature.

The thus obtained carboxylic acid or ester thereof (I) is useful as an intermediate in the synthesis of pharmacologically active isoxazole compounds. For instance, it can be converted into the corresponding dialkylamino-alkylisoxazole according to the following scheme, the latter being useful as an antipyretic, analgesic, antitussive and antiinflammatory agent:

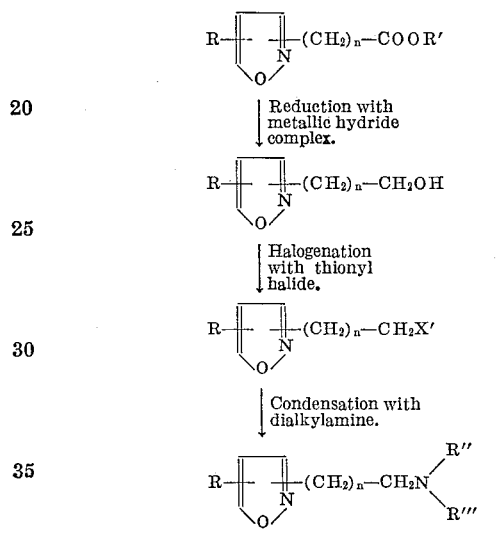

wherein R" and R"' each is a lower alkyl group (e.g. methyl, ethyl, propyl), X' is a halogen atom (e.g. chlorine, bromine) and R and n each has the same significance as designated above.

The following examples are shown for illustration of presently preferred embodiments of the present invention. Parts by weight bear the same relation therein to parts by volume as do grams to milliliters.

*Example 1*

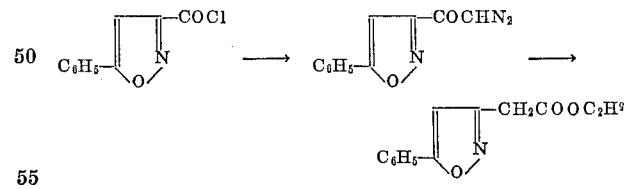

(a) To a solution of diazomethane (prepared from 57 parts by weight of nitrosomethylurea) in 1000 parts by volume of ether, there is gradually added a solution of 30 parts by weight of 5-phenyl-3-isoxazole-carboxylic acid chloride in 400 parts by volume of ether at 0 to 5° C. while stirring, and the resultant mixture is allowed to stand at room temperature (10 to 30° C.) overnight. The separated pale yellowish crystals are collected by filtration and recrystallized from a mixture of benzene and petroleum benzin to give 24.1 parts by weight of (5-phenyl-3-isoxazolyl)-diazomethylketone as pale yellowish plates melting at 162 to 163° C.

(b) To a solution of 1.07 parts by weight of the above prepared (5-phenyl-3-isoxazolyl)-diazomethylketone in 50 parts by volume of ethanol, there is gradually added a suspension 0.2 part by weight of silver oxide in 5 parts by volume of ethanol at 70° C. while stirring, and the resultant mixture is refluxed for 1.5 hours. The reaction mixture is combined with activated carbon and filtered. The filtrate is concentrated under reduced pressure and the residue extracted with hot petroleum ether. The extract is concentrated to ⅓ its volume and cooled. The separated crystals are collected by filtration and recrystallized from petroleum ether to give 0.580 part by weight of ether (5-phenyl-3-isoxazolyl)-ethanoate as colorless needles melting at 48 to 50° C.

*Example 2*

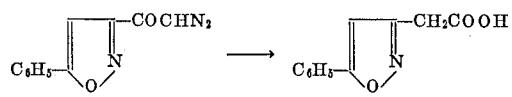

As shown in Example 1 but using water in place of ethanol (5-phenyl - 3 - isoxazolyl)-diazomethylketone is converted into (5-phenyl-3-isoxazolyl)-ethanoic acid which, crystallized from 70% ethanol, forms colorless needles melting at 171 to 172° C. (decomp.).

*Example 3*

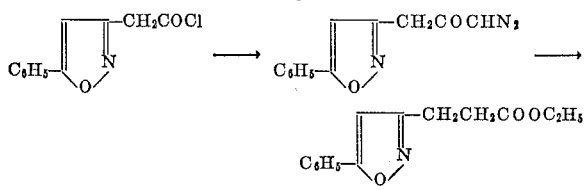

In similar manner, (5-phenyl-3-isoxazolyl)-ethanoic acid chloride is (a) reacted with diazomethane and the resultant (5 - phenyl-3-isoxazolyl)-methyldiazomethylketone can (b) be reacted with ethanol to give ethyl (5-phenyl-3-isoxazolyl)-propanoate as colorless plates melting at 57 to 58° C. (crystallized from petroleum benzin).

*Example 4*

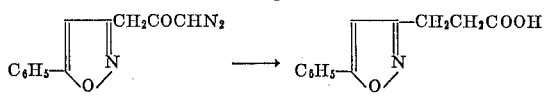

In similar manner, (5-phenyl-3-isoxazolyl)-methyldiazomethylketone is reacted with water to give (5-phenyl-3-isoxazolyl)-propionic acid as colorless plates melting at 162 to 163° C. (crystallized from 95% ethanol).

*Example 5*

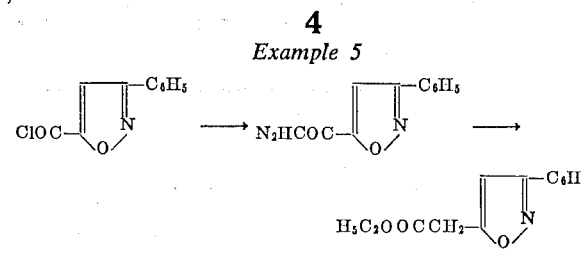

In similar manner, 3-phenyl-5-isoazolecarboxylic acid chloride is (a) reacted with diazomethane and the resultant (3-phenyl-5-isoxazolyl)-diazomethylketone can (b) be reacted with ethanol to give ethyl (3-phenyl-5-isoxazolyl)ethanoate as an oil boiling at 162 to 164° C./5 mm. Hg which is cooled to give colorless needles melting at 45 to 46° C.

*Example 6*

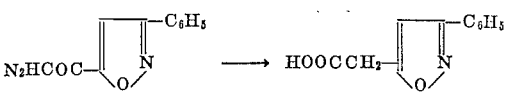

In similar manner, (3-phenyl-5-isoxazolyl)-diazomethylketone is reacted with water to give (3-phenyl-5-isoxazolyl)-ethanoic acid as colorless plates melting at 129 to 130° C. (crystallized from 70% ethanol).

What is claimed is:

1. A compound of the formula:

$$R-\underset{O}{\underset{\|}{\diagdown}}\overset{N}{\diagup}-(CH_2)_{n-1}-COCHN_2$$

wherein R is a member selected from the group consisting of phenyl, lower alkylphenyl, lower alkoxyphenyl and halophenyl, and $n$ is an integer from 1 to 5.

2. (5-phenyl-3-isoxazolyl)-diazomethylketone.
3. (5-phenyl-3-isoxazolyl) - (lower)alkyldiazomethylketone.
4. (5-phenyl-3-isoxazolyl)-methyldiazomethylketone.
5. (3-phenyl-5-isoxazolyl)-diazomethylketone.
6. (3-phenyl-5-isoxazolyl) - (lower)alkyldiazomethylketone.
7. (3-phenyl-5-isoxazolyl)-methyldiazomethylketone.

No references cited.

IRVING MARCUS, *Primary Examiner.*